Patented Sept. 28, 1943

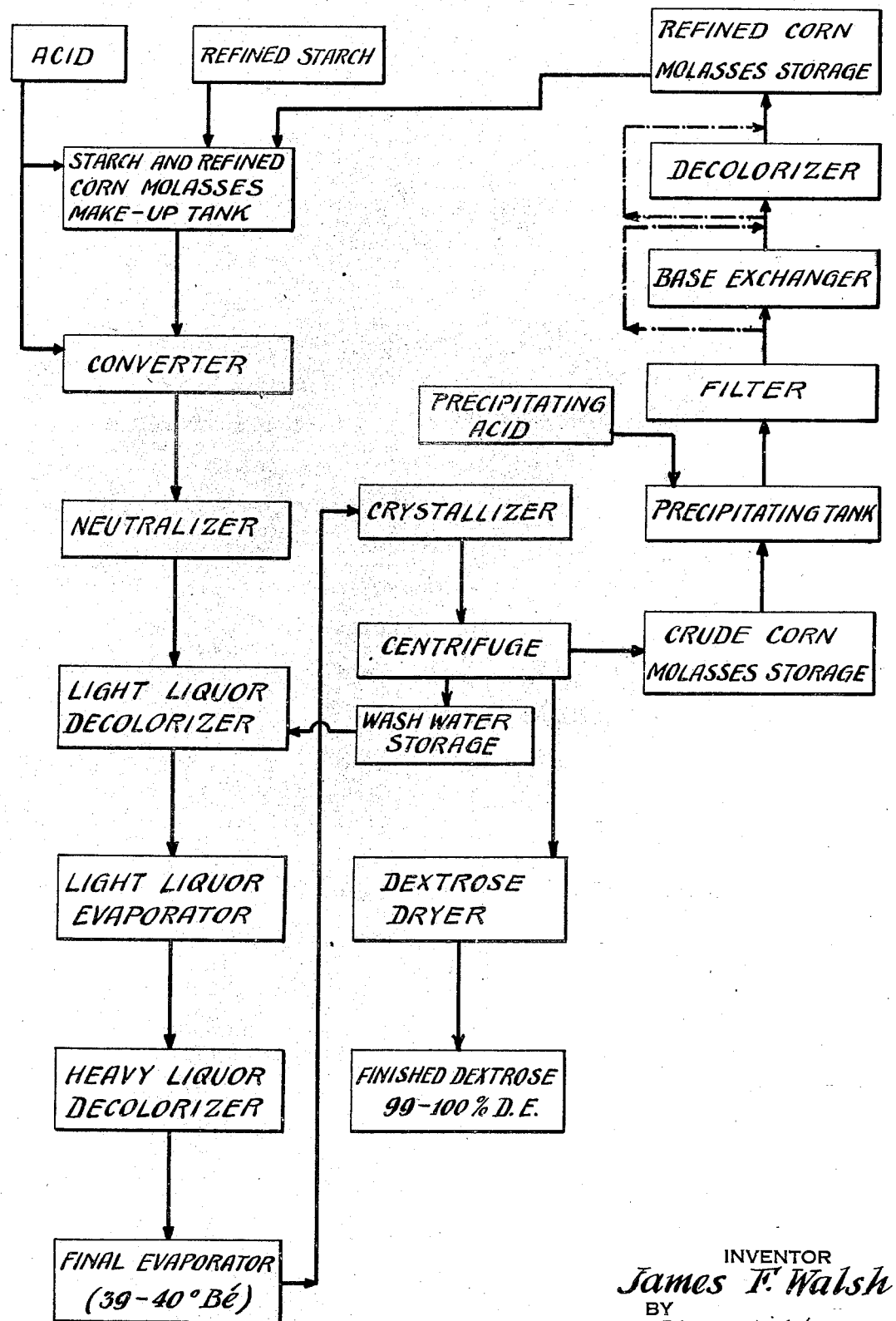

2,330,785

UNITED STATES PATENT OFFICE 2,330,785

METHOD OF MAKING DEXTROSE

James F. Walsh, Yonkers, N. Y., assignor to American Maize-Products Company, a corporation of Maine Application September 25, 1940, Serial No. 358,273

3 Claims. (Cl. 127—40)

This invention relates to a method of making crystallized dextrose and particularly to the making of crystallized dextrose from acid converted starch solution, by a method including neutralizing the solution with a compound of a metal adapted to be precipitated, subjecting the neutralized solution to treatment to cause crystallization of dextrose, effecting precipitation of the metal in the molasses separated from the dextrose, and then utilizing the molasses to provide additional dextrose.

In the usual method of making dextrose, starch is suspended in water and hydrolyzed in the presence of acid, the resulting acidic converted starch solution is neutralized to the desired pH by an alkali metal alkali such as sodium carbonate, and the solution then refined and evaporated to a suitable concentration for subsequent crystallization of dextrose. The concentrated syrup is allowed to cool, so that as much as possible of the dextrose present is crystallized. The remaining mother liquor is separated from the crystals, as by centrifuging, to give a crude molasses. The crystallized dextrose is ordinarily washed with water.

The molasses separated from the dextrose crystals, in this usual method for making dextrose, contains an important part of the total of the starch conversion products. These products in the form of molasses are useful chiefly in markets where the accumulated coloring matters, impurities, and bitter principles resulting from the process are acceptable, in view of the low price obtained.

Attempts have been made to obtain increased yields of dextrose from starch conversion solutions, by either reconversion of the molasses or by repeated reconcentrations and recrystallizations of the molasses. Neither of these methods have proven practical in giving the desired yield of dextrose of satisfactory quality. Recoveries of dextrose have been low, the cost of processing high, or the time cycles involved in the recovery excessively long.

The starch sugar molasses has been utilized by returning it to the system as part of the total suspension going to conversion. Thus, the molasses has been mixed with fresh starch previous to conversion. This method of use has proven unsatisfactory in continuous operation, due to a substantial extent to the ash (inorganic salts) content which builds up in the system, interferes with conversion, and tends to inhibit satisfactory crystallization of dextrose, after the molasses has been repeatedly reused.

The present invention provides a method by which there is produced a molasses low in metal content, so that the molasses is suitable for reuse regularly in providing a source of additional crystallized dextrose. More specifically, the invention provides for the use of a compound of a metal such as calcium, strontium, or barium or the like as the material to effect the neutralization of the starch conversion syrup and for the subsequent removal of the metal used. The removal of the metal is effected preferably by precipitation with an acid, followed by filtration or other step to separate the compound precipitated. In a modification of the invention, the liquid separated from the precipitate is further treated, as by contact with a base exchanger to remove some of the remaining relatively small amount of the metal.

In making the conversion in the method of the present invention there is used, as the acid, hydrochloric, acetic, formic, or other acid that will form a soluble salt with the metal compound added later to neutralize the acid. The salts of such acids with calcium are known to be freely soluble in water. The acid for conversion is added to the starch water mixture in proportion to give about the usual pH, say approximately 0.7 to 2. The acidified mixture is then converted by heating according to conventional practice.

To neutralize the acid subsequent to the conversion, that is, to increase the pH to such a point that coagulable proteins and other coagulable colloidal materials are coagulated, there is used a compound of a metal that forms a soluble salt with the acid used in the conversion and that is adapted to be precipitated by the precipitating agents to be added later. Thus, there is used to advantage an alkaline earth metal compound, as, for instance, the oxide, hydroxide, or carbonate of lime, strontium, or barium. Corresponding magnesium compounds are not recommended, particularly as magnesium is not precipitatable by the preferred precipitating agent, sulfuric acid.

The compound used in the neutralization is added in such proportion as to increase the pH value of the conversion syrup to about 4.0 to 5.5.

The neutralized converted liquid is processed and refined in accordance with standard practice, including concentration and subsequent cooling, to give crystallized dextrose. The dextrose is then separated from the mother liquor.

The resulting mother liquor is treated, according to the present invention, to remove metals and provide a treated mother liquor suitable for use in recovering additional crystallized dextrose.

Thus, the crude molasses separated from the dextrose crystals is treated with a precipitating agent for the metals present, and particularly for the metal introduced at the neutralization stage and present, therefore, in substantial amount. Thus, the molasses is mixed with sulfuric acid, phosphoric acid, or silicic acid in amount at least approximately adequate to precipitate all of the metals present that are precipitatable from water solutions by such acids.

The metals so precipitated are separated from the molasses, as by filtration, filter aids such as diatomaceous earth or finely divided decolorizing carbon being preferably incorporated into the mixture before the filtration is undertaken. The filtrate obtained contains only a small proportion of metals as compared to the metal content of the crude molasses.

The molasses, if to be subjected later to reconversion, is suitably diluted to about 12 to 16° Bé. to cause lowering of the viscosity to such an extent as to facilitate various steps in the refining. Suitably, the dilution is made before the molasses is treated with the precipitating acids, so that all subsequent steps, including the separation of the precipitate by filtration, are promoted.

The dilution is made in any case at or before the reconversion step to be described, so that the conversion with acid is effected when the refined molasses is present in a mixture with water of about 12 to 16° Bé.

The molasses filtrate is subjected to treatment to give an additional amount of crystallized dextrose. Thus, the filtrate, either after or without a preliminary decolorization by carbonaceous material according to the usual technique for decolorizing corn syrup, is processed as follows: It is converted, as by being mixed with fresh starch and then heated with water and acid, and subjected to the cycle of steps including treatment of the resulting molasses to precipitate metal, all as described above. Preferably, the refined molasses is mixed regularly into the make-up charge for conversion in about the proportion to fresh starch that the refined molasses is being currently produced.

In a modification of the invention, the mixing of the refined molasses with fresh refined starch is omitted, the refined molasses being separately reconverted and reprocessed. In such case, conditions of conversion and subsequent processing are as given herein in connection with the example or discussion of the processing after mixture with fresh starch.

Or, the refined molasses may be subjected directly to concentration by evaporation, the concentrated molasses being then cooled, to produce a fraction of crystallized dextrose.

The precipitation method described for removing metals is quite effective as to those metals which form insoluble compounds with the acid used in making the precipitation. For some purposes, however, it is desirable to supplement the precipitation by a base exchanger treatment to remove an additional amount of metals.

The base exchanger treatment, if used, is applied to the molasses after the separation from the precipitated material. The molasses at this stage, either after or without decolorizing, is contacted with base exchange materials of the zeolite type and preferably with the so-called hydrogen zeolites which are activated by acid and which exchange hydrogen for metals in solutions.

Among the zeolites that meet the requirements and that have been used to advantage is the activated organic material produced by treatment of coal, lignite, or wood by the process described by Tiger in Transactions of the American Institute of Mechanical Engineers, 60, No. 11, 315-325 (1938). Such material is known commercially as Zeo-Karb H. This base exchanger has the property of removing various amounts up to about 7000 grains or somewhat more of sodium or other metals from solutions passed slowly over the material, for each cubic foot of the material. The Zeo-Karb H is preferably used under such conditions as to acidity that the solution in contact with the Zeo-Karb is acid to phenolphthalein, say of pH value below 8.3, preferably 4.5 to 6.

Another base exchanger that may be used to advantage is the product of the condensation of formaldehyde with one of the sulfonated phenols, either insolubilized or activated initially or regenerated by acid treatment.

Another base exchanger that may be used is one made as described in U. S. Patent 2,198,381 issued to Ellis.

The invention is not limited to the use of any one particular base exchanger. There may be used any of the commercial base exchangers which remove metal from an aqueous solution of its salts and that do not introduce into the molasses solution treated any substantial amount of interfering water soluble by-products. Acidity is not considered an interfering substance, as acidity is compensated for in the amount of acid added for reconversion or may be neutralized.

The base exchanger selected is preferably used in granular form and filled into a container or tower. The molasses to be purified is caused to flow slowly through the bed of the base exchanger, at such a rate that the time of contact with the base exchanger is substantial, say 1 to 4 hours.

The base exchanger if used is separated from the treated (refined) molasses, as by the passage of the molasses through and out of the container for the exchanger, as described.

A typical example of the practice of the invention will be illustrated in connection with the attached drawing which shows a suitable sequence of steps in our method.

Starchy material, such as refined starch from potatoes, corn, wheat, or barley, or an impure material such as table head starch, is made into a suspension with water and converted by hydrolysis in the presence of acid. Thus, the starch may be made into an aqueous suspension of density about 12 to 16° Bé., hydrochloric acid added, and conversion under steam pressure effected, all in accordance with usual procedure.

During this conversion, dextrose is formed, the conditions of conversion selected giving as high a yield of dextrose as practicable without the introduction of objectionable decomposition and reversion products, such as excessive amounts of materials of bitter taste and undesired coloring material. Ordinarily there may be produced by the conversion a D. E. of about 90 to 93, this being the number of parts of reducing sugar calculated as dextrose for 100 parts of total solids. The total solids other than dextrose are principally maltose, dextrins, and impurities.

The converted material, constituting starch conversion syrup, is treated with a compound of the kind described, suitably calcium hydroxide or carbonate, to adjust the pH to that desired. This is commonly called the neutralization step, the neutralization being effected in a typical procedure to the extent that the pH is raised to about 4.0 to 5.5.

During the neutralization, certain materials that coagulate on adjustment of the pH are separated, particularly the coagulable proteins and fats. These coagulated products are removed by filtration and thus made ready for sale, as for use in the compounding of feeds.

The filtrate from the coagulated material is ordinarily called light liquor.

The light liquor is decolorized in conventional manner, as by passage over animal or vegetable decolorizing carbon. The liquor is then concentrated, say, to about 30° Bé. in evaporators for light liquid, the concentration being carried to about 30 to 31 Bé.

The liquor after concentration is suitably decolorized again with animal or vegetable carbon. In any case, the liquor is concentrated finally to a very high degree, favoring the crystallization of the dextrose in as large proportion as possible when the highly concentrated liquor is cooled. For this reason, the final concentration may be continued in an evaporator until the density of the liquor is about 39 to 40° Bé.

The concentrated liquor is then transferred to a crystallizer, in which crystallization of dextrose is effected in usual manner. Thus, the concentrated liquor may be charged into the crystallizer which contains initially a certain amount of the massecuite from a previous crystallization, this massecuite serving to seed the new charge in the crystallizer. Ordinarily the crystallization proceeds for a considerable period of time, suitably 4 to 5 days during which time the temperature falls from about 120° to around 75° F.

The resulting massecuite, including crystals and molasses as the mother liquor, is centrifuged, the molasses being removed by the centrifugal action.

The dextrose crystals in the centrifuge are then washed with water, the first portion of the effluent being combined with the molasses fraction until the purity of the effluent becomes at least 85 D. E. When this stage is reached, then the later portions of wash water are diverted to a previous step in the process preceding the evaporation; suitably the wash water of 85 purity or more is added to the light liquor passing into the light liquor decolorizer.

When the water washing is completed, the dextrose is discharged from the centrifuge and dried, the dried material being ordinarily 99 to 100% D. E.

The crude molasses separated as described above is now treated to remove from the molasses substances which interfere with the conversion of solids to dextrose.

The crude molasses is treated, either after dilution, say to about 12 to 16° Bé. or without dilutions with one of the precipitating agents described for removing the calcium or other metal added at the neutralization stage, sulfuric acid being the preferred precipitating agent. Thus, sulfuric acid, is stirred into the molasses in amount adequate to react with all the metals present that are precipitatable with sulfuric acid. Any substantial excess of the precipitating acid is avoided, so that interfering effects in subsequent steps are not introduced.

The addition of the sulfuric acid or other precipitating agent causes precipitation of the water insoluble salt of the metal added to neutralize the conversion liquor. This precipitated material is then separated, as by filtration and suitably after the addition of a conventional filter aid or decolorizing material, to increase the rate of filtration and clarity obtained by filtration or to cause some decolorizing at this stage.

The refined molasses separated from the precipitate is then treated for the recovery of additional dextrose, as by reconcentration to about 39 to 40° Bé. in a usual type of evaporator followed by cooling to cause crystallization of dextrose.

Or, the refined molasses may be reconverted. For this purpose, the refined molasses are diluted to about 12 to 16° Bé. and then reconverted in the presence of acid, to give an additional amount of dextrose, and the cycle of steps above described including neutralization with a calcium compound or the like is repeated, with the production of crystallized dextrose.

In another embodiment of the invention, the molasses, after separation from the precipitated metal, is mixed with fresh starch, in a make-up charge for conversion, and the cycle of steps repeated, to give crystallized dextrose attributable in part to the fresh starch and in part to the molasses used.

The method described avoids the accumulation in the corn molasses separated from the dextrose of metals introduced at the neutralization stage. As a result there is obtained a refined molasses that is highly suitable for repeated and practically indefinite reuse with fresh starch in the conversion step of the process or for reworking separately, to give additional amounts of crystallized dextrose.

It will be understood that the details given are for the purpose of illustration and that variations within the spirit of the invention are intended to be included within the scope of the appended claims.

What I claim is:

1. In making crystallized dextrose, the method which comprises converting starch in the presence of water and an acid adapted to form a freely soluble salt with calcium, neutralizing the resulting conversion liquor to a pH of about 4 to 5.5 with an acid-neutralizing calcium compound, separating the material coagulated on neutralization, decolorizing the resulting clarified liquor and evaporating the liquor to a syrup of high concentration permitting the crystallization on cooling of a major part of the dextrose contained in the liquor, crystallizing dextrose from the said syrup, separating the crystallized dextrose from the mother liquor remaining as molasses, treating the separated molasses with sulfuric acid so as to remove a large part of the calcium from the molasses as precipitated calcium sulfate, separating the molasses from the precipitate, then diluting the molasses, and subjecting the diluted molasses to acid conversion to produce additional dextrose.

2. The method described in claim 1 which includes effecting the treatment with sulfuric acid in amount not substantially in excess of the amount equivalent to the calcium present so that the sulfuric acid added is practically completely precipitated, effecting the conversion of the diluted molasses with an acid whose calcium salt is freely soluble, neutralizing the liquor resulting from conversion of the diluted molasses to a pH of about 4 to 5.5 with an acid-neutralizing calcium compound, separating the material coagulated on neutralization, decolorizing the resulting clarified liquor and evaporating the liquor to a syrup of high concentration permitting the crystallization on cooling of a substantial part of the said additional dextrose contained in the liquor, and then cooling the concentrated syrup so as to cause crystallization of dextrose.

3. The method described in claim 1 including mixing the diluted molasses with fresh starch before the said acid conversion to produce additional dextrose and then repeating the complete cycle of steps described in claim 1 beginning with the conversion by an acid adapted to form a freely soluble salt with calcium.

JAMES F. WALSH.